Feb. 21, 1928.
J. K. PIERCE
1,660,235
METHOD OF AND APPARATUS FOR SEPARATING OILS
Filed April 5, 1926
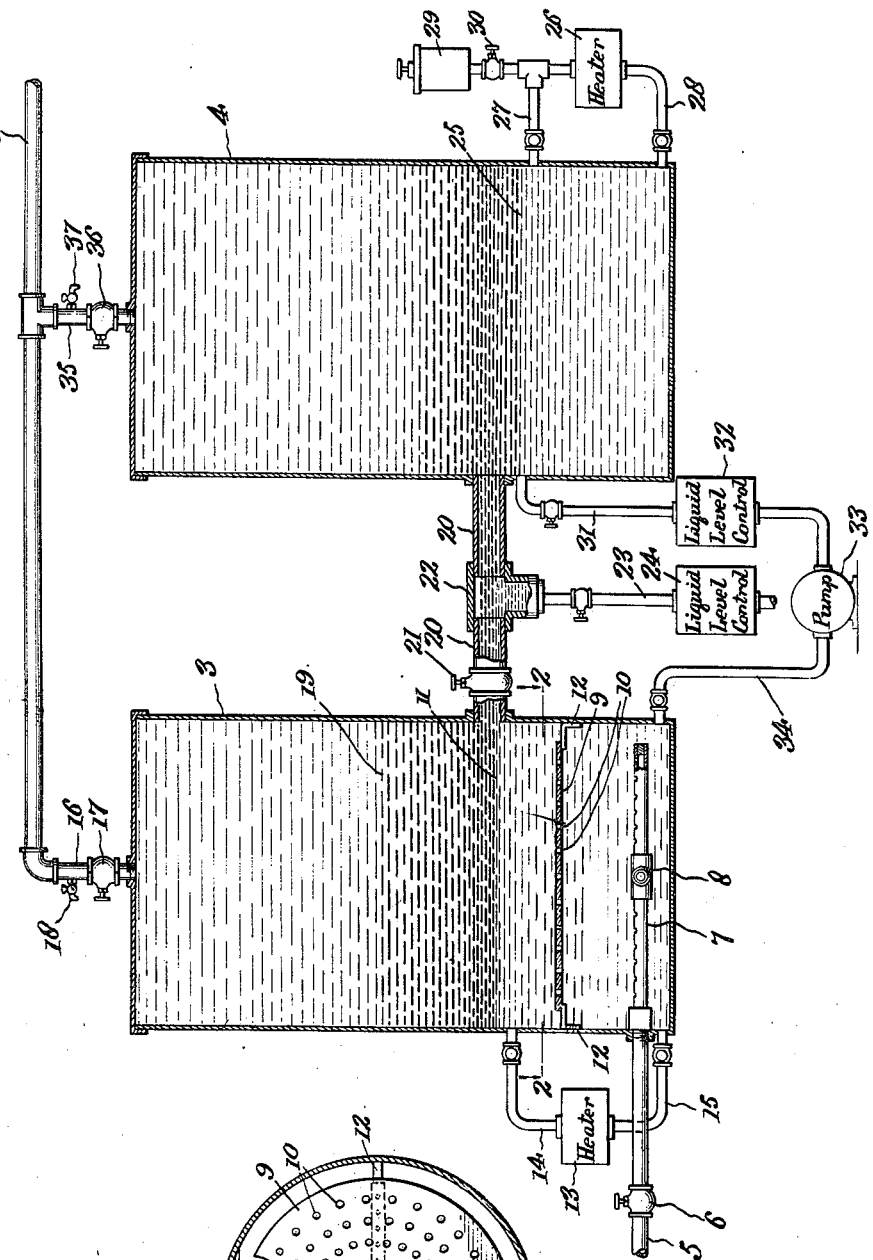
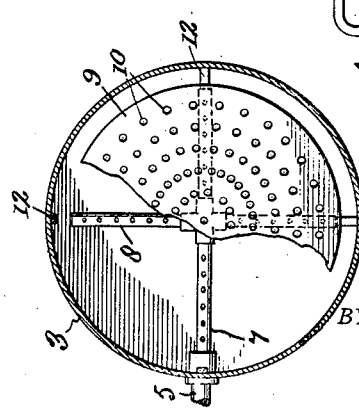
INVENTOR
John K. Pierce
BY Wilkinson & Giusta
ATTORNEYS.

Patented Feb. 21, 1928.

1,660,235

UNITED STATES PATENT OFFICE.

JOHN KELLAR PIERCE, OF FORT WORTH, TEXAS, ASSIGNOR OF ONE-HALF TO WILLIAM S. PIERCE, OF MURPHY, NORTH CAROLINA.

METHOD OF AND APPARATUS FOR SEPARATING OILS.

Application filed April 5, 1926. Serial No. 99,945.

The present invention relates to improvements in the method of and apparatus for separating oils and has for an object to treat cut oils and what are known as "bottom settlings".

Another object of the invention is to provide an expeditious process and a compact apparatus for separating the water and bottom settlings from the oil in a preliminary phase of the process and subsequently drawing off and subjecting the bottom settlings to a separate treatment whereby to further separate the oil therefrom.

A further object of the invention resides in the treatment of the oil to be separated with a chemical designed to promote the separation and to heat this chemical which further enhances its ability to promote such separation.

A still further object of the invention resides in so arranging the tanks in which the two phases of the process are carried out, that the chemical in the second tank may be circulated when it is reduced to a weakened condition to the first tank and is used a second time for the preliminary separation of the initially introduced cut oils.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical sectional view taken centrally through the apparatus constructed according to the present invention, with parts in elevation, and Figure 2 is a horizontal section taken on line 2—2 of Figure 1, with parts broken away.

Referring more particularly to the drawings, 3 and 4 designate two tanks of appropriate capacity closed as to the bottom sides and top in order that the process may be carried out under suitable pressure. The untreated oil is supplied through a pipe 5 under the control of a valve 6 to the base of the initial tank 3. Within this tank 3 is a pair of closed perforated pipes 7 and 8 having minute series of perforations therein along the upper portions of the pipes in order to direct the incoming oil upwardly and beneath a baffle plate 9 which is stretched horizontally across the tank 3 at a low point therein. The partition or diaphragm 9 is provided with numerous perforations 10 to permit the restricted upward flow of the mixture.

The part 9 is also of slightly less diameter than the internal diameter of the tank 3, thereby providing an annular space about the peripheral edge of the diaphragm to permit of the upward rising current of the oil mixture and the chemical solution which is maintained in the tank approximately up to the level line indicated at 11. The partition may be supported in the tank in any appropriate manner as by the use of angle brackets 12 secured to the side walls of the tank 3 and to the base of the partition as by soldering. The outer ends of the pipe branches 7 and 8 are closed to force the oil mixture to ascend upwardly through the perforations, and the baffle plate or partition 9 will retard this upward flow or current, causing minute streams to issue upwardly through the perforations 10 into the relatively quiescent pool of liquid above the parition. The partition or baffle plate 9 will also deflect a large portion of the ascending liquid outwardly or radially toward the side walls of the tank 3 where an annular column of liquid of restricted cross section is permitted to rise between the peripheral edge of the partition and said side walls. There will also be a gradual motion of the liquid body, as the liquid body in moving into this annular vertical column will do so only by turning at substantially right angles from beneath the bottom of the baffle plate 9. This further insures the delivery of the oil mixture with the separating chemical slowly and uniformly to the body of liquid above the partition. The perforated partition or baffle plate 9 is further useful because of the desirability of using a heated chemical and to include this chemical in a heating circuit involving the heater member 13 and the branch pipes 14 and 15. The chemical solution in the tank 3 gradually cools by contact with the cooler oil mixture and descends, whereupon it is drawn into the branch pipe 15 and upwardly through the heater 13, the heated chemical regaining the tank through the upper branch pipe 14. Through the action of convection currents, the solution is made to travel in the heater circuit. This heater circuit is opposed to the tendency of the introduced oil mixture to rise in the tank and these two currents will counteract each other and promote quietude in the tank which is desirable to the highest degree for the purposes of gravity separation. The partition 9 is located between the branch pipes 14 and 15 and it therefore breaks up the heater circuit and requires a slower flow than would be otherwise had if the convection currents were permitted to operate with entire freedom.

During the progress of separation in the initial tank 3, the oil, which is the lightest fraction, ascends to the top of the tank and may be drawn off through the eduction pipe 16 by manipulating the valve 17. In this pipe is a petcock 18 used for drawing off samples of the oil.

The bottom settlings form the intermediate stratum, as they are heavier than the oil, but lighter than the water and chemical solution. The numeral 19 indicates the line between the oil and bottom settlings. The bottom settlings contain considerable valuable oil, but it is more difficult to separate this oil and provision is therefore made for drawing off the bottom settlings from the preliminary separation in tank 3 and introducing the same to the final tank 4. For this purpose a pipe 20 is shown as connecting the two tanks. The point of connection of this pipe 20 is made with the tank 3 at or about the line 11. In fact, the major port area of the pipe 20 at its connection with the tank 3 is exposed to the zone containing the bottom settlings whereby these bottom settlings may flow freely into the final tank 4. The remaining portion of said port area is exposed to the water and chemical mixture, the water and chemical mixture having substantially the same specific gravity and therefore becoming co-mingled. The arrangement is such that the lower zone for the chemical mixture, which zone tends to enlarge and encroach on the intermediate zone for the bottom settlings owing to the constant addition of water to the chemical mixture, is kept constant by providing an overflow for the chemical mixture and oil through the pipe 20. This pipe 20 may or may not have a valve 21 therein. The valve 21 may be closed to prevent outflow of the bottom settlings whenever desired. The pipe 20 is furthermore provided with a trap 22 made in the form of a T, joining two sections of the pipe at its horizontal branches and connected at its downwardly disposed branch with a pipe 23 leading to a liquid level control 24, or a suitable receptacle for holding the overflow water and chemical from tank 3. The water and chemical are thus exposed to the trap and all such water and chemical will be evacuated through the pipe 23. The bottom settlings, however, are supported upon the water and chemical body and they will flow on into the pipe 20 and into the final tank 4, where a stronger chemical solution is maintained up to the level indicated at 25. This stronger solution is maintained in a circuit in which the heater 26 is included with the upper branch pipe 27 and lower branch pipe 28. The heater circuit also contains a reservoir 29 for additional chemical solution, having a valve 30 below in a pipe which connects the reservoir with the heater circuit. More chemical solution may be added from time to time in order to maintain the strength necessary for treating the bottom settlings. An overflow pipe 31 is connected to the tank 4 at or about the level 25 desired for the chemical solution and this overflow pipe is connected with any form of liquid level control 32. A pump 33 may be connected to the overflow pipe 31 and to the control 32, in order to withdraw the weakened solution after use in the final tank 4 and circulate it through the pipe 34 to the initial tank 3.

The final tank 4 may be also closed as to its bottom sides and top portion in order that suitable pressure of the bottom settlings and chemical be maintained therein. The purified oil is drawn off through the top by the pipe 35 having the control valve 36 and the petcock 37. The pipe 35 connects with a common eduction pipe 38 by which oil from all of the tanks in the series may be carried to a desired designation.

In the use of the device, a preliminary separation of oil is first had in the tank 3 as the untreated oil mixture contains a relatively great volume of free oil which will be given up rapidly when subjected to gravity separation. By manipulation of the valve 6 and the valves 17 and 36, any suitable pressure may be maintained in the tanks and the progress of the separation will be governed accordingly. This pressure, created by closing, for instance, the valve 17, will act to force out the bottom settlings into the final tank 4. The cut oil, or bottom settlings, which are treated by this device, are composed of an emulsion of oil and water, the water being in minute particles and encased in a film of oil and forming an emulsion which is heavier than oil and lighter than water. It, therefore, is suspended between the oil and water or chemical solution in the tanks. As will be seen, this emulsion rides directly on top of the heated chemical solution and the oil gravitates upwards. This operation goes on continuously or as long as there is untreated emulsion in either tank.

The arrangement permits of a great saving in the chemical solution and renders the process cheaper by first employing a weak chemical solution to reclaim the oil from the emulsion while subjecting only the more refractory bottom settlings to the action of the stronger and more expensive chemical solution in the final tank 4. The invention is furthermore economical in the recovering of the spent chemical solution from tank 4 and its utilization in the preliminary tank 3 where it will be found strong enough for all purposes of preliminary separation.

Any chemical, combination of chemicals, or chemical solution that will serve to break down the film of oil separating the globules of water contained in the emulsion from the chemical solution at the line of demarkation, thus permitting the water, composing the globules, to unite with the chemical solution by physical action will successfully treat an emulsion of the character described when used in my process.

As to the chemicals suitable for use in my process—sulphuric acid or a soluble metallic sulfate will perform the operation. Soluble carbonates, or a mixture of soluble carbontes, sulfates and silicates and adding a soluble hydrate to make sufficiently alkaline. Soluble soaps, or soaps, carbonates and silicates mixed. Oleic acid, or oleic acid, rosin and fatty substances from which soaps are made. Carbonate of soda, soaps made of oleic acid and carbonate of soda. A mixture of sulfate, carbonate or silicate of soda, or sulfate of soda and caustic soda will also perform the operation when used in my process.

There are also chemicals or compounds on the market for household or laundry use, the formulas of which I do not know, that will perform the desired operation when used in my process. They are more particularly certain soaps and a well-known cleanser called "Gold Dust."

It is obvious that various changes and modifications may be made in the details of construction and design of the above specifically described embodiment of this invention without departing from the spirit thereof, such changes and modifications being restricted only by the scope of the following claims.

Having thus described my invention, what I claim and desire to secure by Letters Patent of the United States, is:—

1. An apparatus for separating oils comprising initial and final tanks containing chemical solutions, means for introducing the oil to be treated at the lower portion of the initial tank and into the chemical solution, baffle means in the initial tank adapted to be submerged in the chemical solution and above the oil-introducing means, means for drawing off the purified oil at the upper portion of said initial tank, means interconnecting the tanks, the upper surface level of the chemical solution and zone above the chemical solution in the initial tank adapted to register with said inter-connecting means, a trap for receiving the chemical solution from said means, said means also adapted to carry bottom settlings from the initial tank to the final tank, a liquid level control for the chemical in the final tank, means connected with said liquid level control for circulating the weakened chemical solution from the final tank to the initial tank, and means for drawing off the purified oil from the upper portion of the final tank.

2. An apparatus for the separation of oils comprising initial and final tanks, the lower portion of said final tank being adapted to contain a strong chemical solution body the lower portion of said initial tank being adapted to contain a relatively weaker body of chemical solution, means for withdrawing the bottom settlings from an intermediate zone in the initial tank and transferring the same to the final tank, liquid level controls for the chemical solutions in both tanks, the liquid level control for the final tank being in communication with the lower portion of the initial tank, means for introducing the mixture of oil to the lower portion of the initial tank, heating elements connected to the tanks for heating the chemical solution bodies, and means for drawing off purified oil from the upper portions of said tanks.

3. An apparatus for the separation of oils comprising initial and final tanks, the lower portion of said final tank being adapted to contain a strong chemical solution body the lower portion of said initial tank being adapted to contain a relatively weaker body of chemical solution, means for withdrawing bottom settlings from an intermediate zone in the initial tank and transferring the same to the final tank, liquid level controls for the chemical solutions in both tanks, the liquid level control for the final tank being in communcation with the lower portion of the initial tank, means for introducing the mixture of oil to the lower portion of the initial tank, baffle means supported in the lower portion of said initial tank and immersed in the chemical solution body therein, said baffle means having minute perforations therethrough, means for drawing off purified oil from the upper portions of said tanks.

4. An apparatus for the separation of oils comprising initial and final tanks, the lower portion of said final tank being adapted to contain a strong chemical solution body the lower portion of said initial tank being adapted to contain a relatively weaker body of chemical solution, means for withdrawing bottom settlings from an intermediate zone in the initial tank and transferring the same to the final tank, liquid level controls for the chemical solutions in both tanks, the liquid level control for the final tank being in communication with the lower portion of the initial tank, means for introducing the mixture of oil to the lower portion of the initial tank, a baffle plate in the lower portion of the initial tank, supported with its peripheral edge spaced from the walls of said initial tank to provide an annular passage therebetween for an upwardly rising column of liquid, said baffle plate being further provided with minute perforations therethrough for permitting of the retarded flow of the liquid upwardly therethrough and means for drawing off purified oil from the upper portions of said tanks.

5. The herein described method for treating cut oils which consists in introducing the cut oil in minute streams upwardly into a body of chemical solution maintained at substantially constant level in the bottom of an initial tank, while at the same time causing the chemical solution to flow in the opposite direction through a heater circuit, forming bottom settlings in the initial tank baffling both the current flowing in the heater circuit and the upwardly moving current of introduced cut oils, withdrawing the separated oil from the upper portion of said initial tank, withdrawing both the excess comingled chemical solution and water and the bottom settlings from an intermediate zone in the initial tank, trapping said excess water and chemical solution and diverting the bottom settlings to a final tank, subjecting the bottom settlings in the final tank to treatment with a stronger chemical solution, while causing this chemical solution to flow in a heater circuit, withdrawing the purified oil from the upper portion of the final tank, and withdrawing the excess weakened chemical solution from the final tank and circulating it to the lower portion of the initial tank.

JOHN KELLAR PIERCE.